United States Patent
Ellis et al.

(10) Patent No.: US 7,386,765 B2
(45) Date of Patent: Jun. 10, 2008

(54) MEMORY DEVICE HAVING ERROR CHECKING AND CORRECTION

(75) Inventors: Robert M. Ellis, Hillsboro, OR (US);
Kuljit S. Bains, Olympia, WA (US);
Chris B. Freeman, Portland, OR (US);
John B. Halbert, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 214 days.

(21) Appl. No.: 10/674,320

(22) Filed: Sep. 29, 2003

(65) Prior Publication Data

US 2005/0081085 A1    Apr. 14, 2005

(51) Int. Cl.
*G06F 11/00* (2006.01)
*G06F 3/00* (2006.01)
*G06F 12/00* (2006.01)

(52) U.S. Cl. ............................ 714/62; 714/6; 710/52; 711/100

(58) Field of Classification Search ................ 710/6, 710/7, 58, 59, 60, 18; 714/6, 42
See application file for complete search history.

(56) References Cited

U.S. PATENT DOCUMENTS

| | | | | | |
|---|---|---|---|---|---|
| 5,784,712 | A | * | 7/1998 | Byers et al. ............... | 711/219 |
| 6,349,390 | B1 | * | 2/2002 | Dell et al. .................... | 714/6 |
| 6,845,472 | B2 | * | 1/2005 | Walker et al. ............... | 714/42 |
| 2002/0167791 | A1 | * | 11/2002 | Goris ......................... | 361/684 |
| 2002/0184556 | A1 | * | 12/2002 | Hashemi ....................... | 714/6 |
| 2004/0003165 | A1 | * | 1/2004 | Schulz et al. .................. | 711/5 |
| 2004/0260991 | A1 | * | 12/2004 | Vogt et al. ................... | 714/738 |

* cited by examiner

*Primary Examiner*—Alan S. Chen
(74) *Attorney, Agent, or Firm*—Racheol Wu

(57) ABSTRACT

Apparatus and method to carry out checks for memory errors within a memory device independently of a memory controller during times when there is no activity on a memory bus coupling the memory device to the memory controller that involves the memory device.

12 Claims, 7 Drawing Sheets

MEMORY DEVICE HAVING ERROR CHECKING AND CORRECTION

BACKGROUND

With ever greater demands to be able to store and retrieve data ever more quickly, memory devices, including dynamic random access memory (DRAM) devices, have continued to become ever faster. With the increasing speed of the memory devices has been an accompanying need for increases in the speed of the memory interfaces and memory busses used to communicate addresses, commands and data with these memory devices. Concerns have arisen as to whether or not the current practice of bussing the majority of signals provided by the memory interface of a memory controller to multiple memory devices, such as dual inline memory devices (DIMMs), will continue to be possible as the speed of these signals continue to increase.

Both increasing speed and increasing desires to conserve power have also raised concerns about increasing the efficiency of how memory interfaces and memory busses are used, and have raised the issue of finding ways to decrease the overhead in communicating addresses and/or commands required in the communication of data to and from memory devices. As demands to transfer data ever faster have continued to increase, every use of a memory interface and/or memory bus to transfer an address or command has started to become viewed as a lost opportunity to have used that amount of time and electrical energy to transfer data, instead.

BRIEF DESCRIPTION OF THE DRAWINGS

The objects, features, and advantages of the present invention will be apparent to one skilled in the art in view of the following detailed description in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention.

Embodiments of the present invention concern incorporating support for the detection and/or correction of data errors within a memory module, either in place of or in cooperation with the detection and/or correction of data errors via circuitry within a memory controller. Although the following discussion centers on DRAM devices in which memory cells are organized into multiple two dimensional arrays of rows and columns, it will be understood by those skilled in the art that the invention as hereinafter claimed may be practiced in support of any type of memory device having memory cells organized in any of a number of ways, including interleaved banks, arrays of more than two dimensions (i.e., more than two-part addresses), content-addressable, etc. Also, although at least part of the following discussion centers on memory devices within computer systems, it will be understood by those skilled in the art that the invention as hereinafter claimed may be practiced in connection with other electronic devices having memory devices.

Figure 1:
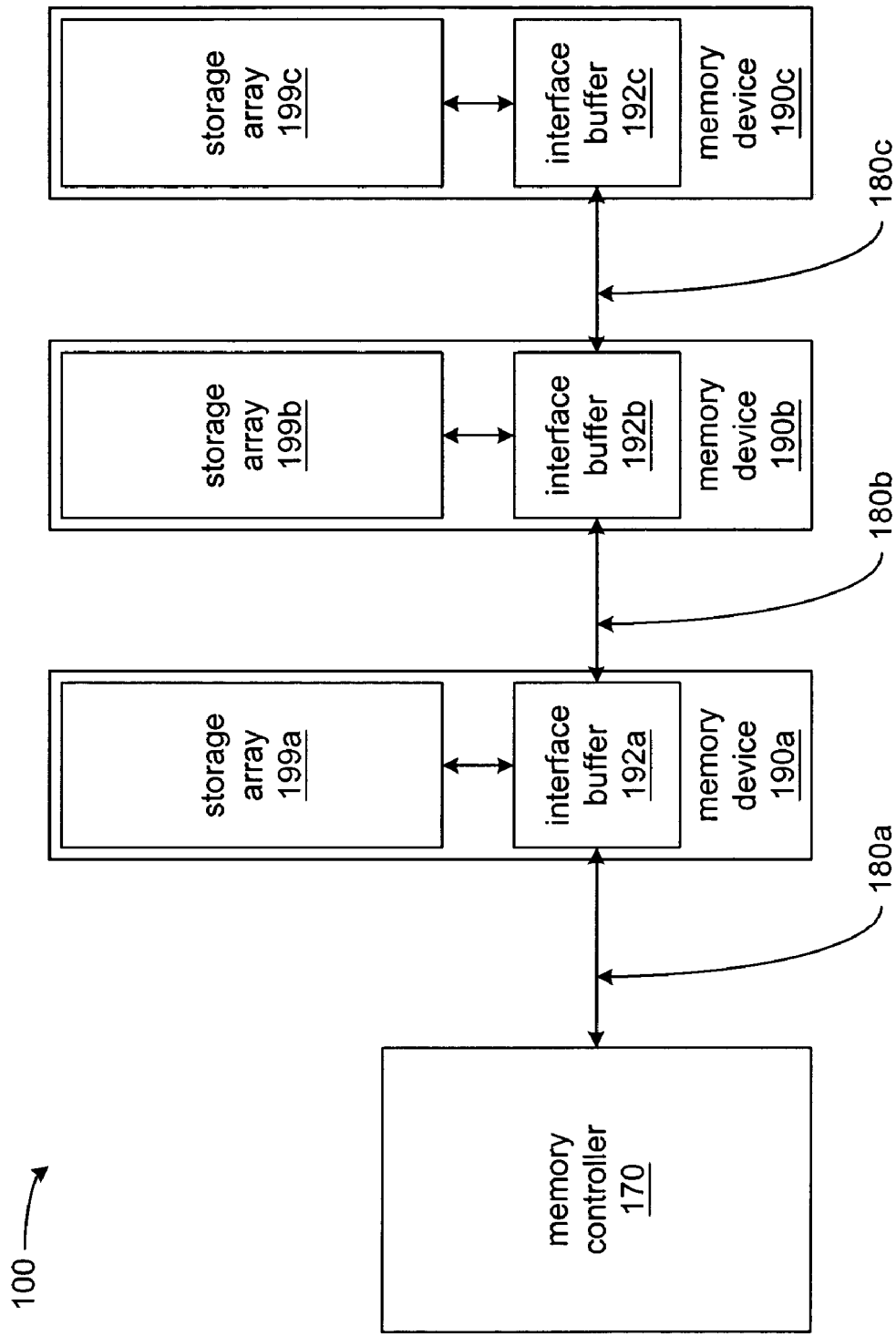
FIG. 1 is a block diagram of an embodiment employing a memory system.

FIG. 1 is a simplified block diagram of one embodiment employing a memory system. Memory system 100 is, at least in part, made up of memory controller 170 and memory devices 190*a-c* coupled together via memory busses 180*a-c* in a series of point-to-point connections. Those skilled in the art of the design of memory systems will readily recognize that FIG. 1 depicts but one form of a relatively simple memory system, and that alternate embodiments are possible in which the exact arrangement and configuration of components may be reduced, augmented or otherwise altered without departing from the spirit and scope of the present invention as hereinafter claimed. For example, although memory system 100 is depicted as having three memory devices 190*a-c* coupled through a single chain of point-to-point connections to just one memory interface provided by memory controller 170, it will be readily understood by those skilled in the art that other possible embodiments of memory system 100 may be made up of multiple parallel chains of point-to-point connections coupling differing numbers of memory devices.

Memory controller 170 controls the functions carried out by memory devices 190*a-c* as part of providing access to memory devices 190*a-c* to external devices (not shown) that are separately coupled to memory controller 170. Specifically, an external device coupled to memory controller 170 issues commands to memory controller 170 to store data within one or more of memory devices 190*a-c*, and to retrieve stored data from one or more of memory devices 190*a-c*. Memory controller 170 receives these commands and relays them to memory devices 190*a-c* in a format having timing and protocols compatible with memory bus 180*a*. In effect, memory controller 170 coordinates accesses made to memory cells within memory devices 190*a-c* in answer to read and write commands from external devices.

Each of memory busses 180*a-c* provide a point-to-point connection, i.e., a bus wherein at least the majority of the signals making up that bus connect between only two devices. Limiting the connection of the majority of signals to only two devices aids in maintaining the integrity and desirable electrical characteristics of that majority of signals, and thereby more easily supports the reliable transfer of high speed signals. Memory controller 170 is coupled to memory device 190*a* via memory bus 180*a*, forming a point-to-point connection between memory controller 170 and memory device 190*a*. In turn, memory device 190*a* is likewise further coupled to memory device 190*b* via memory bus 180*b*, and memory device 190*b* is further coupled to memory device 190*c* via memory bus 180*c*. Addresses, commands and data transfer between memory controller 170 and memory device 190*a*, directly, through memory bus 180*a*, while addresses, commands and data must transfer between memory controller 170 and memory devices 190*b* and 190*c* through intervening memory devices and memory busses.

Memory busses 180*a-c* may be made up of various separate address, control and/or data signal lines to communicate addresses, commands and/or data, either on separate conductors or on shared conductors in different phases occurring in sequence over time in a multiplexed manner.

Alternatively, or perhaps in conjunction with such separate signal lines, addresses, commands and/or data may be encoded for transfer in various ways and/or may be transferred in packets. Memory busses 180a-c may also communicate address, command and/or data parity signals, and/or error checking and correction (ECC) signals. As those skilled in the art will readily recognize, many forms of timing, signaling and protocols may be used in communications across a point-to-point bus between two devices. Furthermore, the exact quantity and characteristics of the various signal lines making up various possible embodiments of memory busses 180a-c may be configured to be interoperable with any of a number of possible memory interfaces, including widely used current day interfaces or new interfaces currently in development. In embodiments where activity on various signal lines is meant to be coordinated with a clock signal (as in the case of a synchronous memory bus), one or more of the signal lines, perhaps among the control signal lines, serves to transmit a clock signal across each of memory busses 180a-c.

Each of memory devices 190a-c are made up of one each of interface buffers 192a-c and storage arrays 199a-c, respectively, with corresponding ones of interface buffers 192a-c and storage arrays 199a-c being coupled together within each of memory devices 190a-c. Storage arrays 199a-c are each made up of an array of memory cells in which the actual storage of data occurs. In some embodiments, storage arrays 199a-c may each be made up of a single integrated circuit, (perhaps even a single integrated circuit that also incorporates corresponding ones of interface buffers 192a-c), while in other embodiments, storage arrays 199a-c may each be made up of multiple integrated circuits. In various possible embodiments, interface buffers 192a-c are made up of one or more integrated circuits separate from the one or more integrated circuits making up storage arrays 199a-c, respectively. Also, in various possible embodiments, each of memory devices 190a-c may be implemented in the form of a SIMM (single inline memory module), SIPP (single inline pin package), DIMM (dual inline memory module), or any of a variety of other forms as those skilled in the art will recognize.

Interface buffers 192a-c provide an interface between corresponding ones of storage arrays 199a-c and one or more of memory busses 180a-c to direct transfers of addresses, commands and data between each of storage arrays 199a-c and memory controller 170. In the case of memory device 190a, interface buffer 192a directs transfers of addresses, commands and/or data intended to be between memory controller 170 and memory device 190a to storage array 199a, while allowing transfers of addresses, commands and/or data intended to be between memory controller 170 and other memory devices (such as memory devices 190b and 190c) to pass through interface 192a. In some embodiments of memory devices 190a-c, especially where storage arrays 199a-c are made up of multiple integrated circuits, interface buffers 192a-c may be meant to provide an interface to storage arrays 199a-c that are meant to be compatible with widely used types of memory devices, among them being DRAM (dynamic random access memory) devices such as FPM (fast page mode) memory devices, EDO (extended data out), dual-port VRAM (video random access memory), window RAM, SDR (single data rate), DDR (double data rate), RAMBUS™ DRAM, etc.

Figure 2:
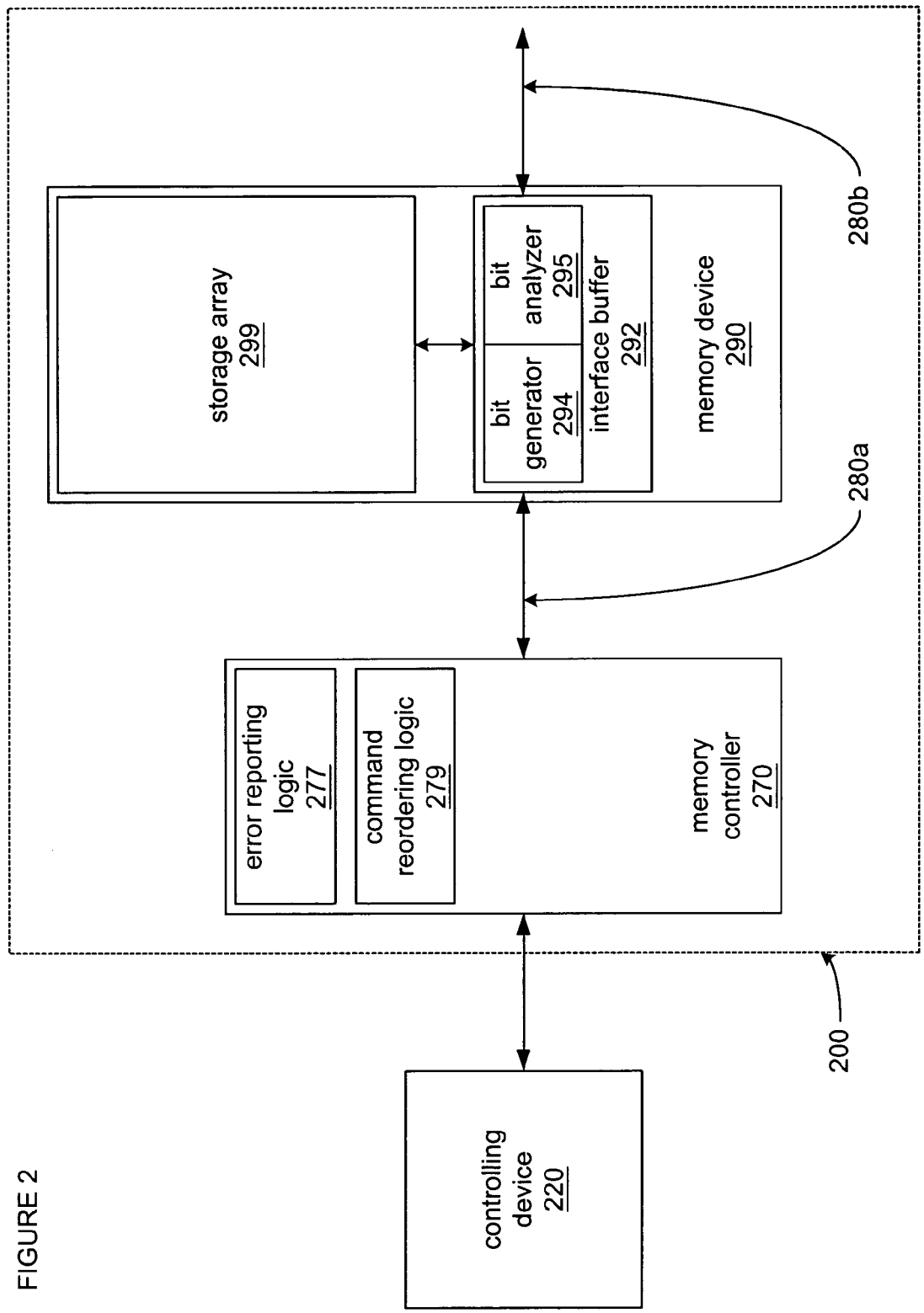
FIG. 2 is another block diagram of an embodiment employing a memory system.

FIG. 2 is another block diagram of an embodiment employing a memory system. Memory system 200 is, at least in part, made up of memory controller 270 and memory device 290 coupled together via memory bus 280a in a point-to-point connection. Although FIG. 2 depicts the connection of only one memory device (namely memory device 290) to memory controller 270, this is but one example of a configuration of a memory system depicted for sake of simplicity of discussion, and as hinted in FIG. 2, interface buffer 292 of memory device 290 may provide the ability to form a point-to-point connection with another device via memory bus 280b.

Memory controller 270 controls the functions carried out by memory device 290 as part of providing another device, such as controlling device 220 which is coupled to memory controller 270, with access to memory device 290. Specifically, controlling device 220 issues commands to memory controller 270 to store data within and retrieve data from memory device 290. In turn, memory controller 270 coordinates accesses made to memory cells within memory device 290 to store and retrieve data in answer to read and write commands from controlling device 220. In some embodiments, controlling device 220 may be a processor making up part of the core of a computer system or other digital electronic device. In other embodiments, controlling device 220 may be an I/O or coprocessing device, or other component of a computer or other digital electronic system that has bus mastering capabilities to the extent necessary to transmit read/write commands to memory controller 270.

In some embodiments, memory controller 270 may incorporate error reporting logic 277 to relay indications of a memory error received from memory device 290 back to controlling device 220. In response, the controlling device may carry out various forms of diagnostic or other operations to discern the precise nature of the memory error and/or to isolate the memory error. The controlling device may log the occurrence of such an memory error and/or provide a message to a system administrator or other personnel of the occurrence of the memory error.

Memory device 290 provides a number of memory cells to store data that may be provided and/or required by controlling device 220, with those memory cells being organized into an array within storage array 299. Interface buffer 292 within memory device 290 receives read and write commands across memory bus 280a, and accesses appropriate memory cells within storage array 299 to either store or retrieve data as commanded. To ensure against memory errors being introduced as data is stored or retrieved, or to at least ensure that occurrences of such errors are found, interface buffer 292 may incorporate bit generator 294 to generate parity bits to be stored along with corresponding data within storage array 299 and/or bit analyzer 295 to check data and corresponding parity bits retrieved from storage array 299 for memory errors indicated as a result of discovering parity errors. In such embodiments, where memory errors are found, interface buffer 292 may transmit an indication of such memory errors back to error reporting logic 277 within memory controller 270.

Other embodiments may go further than checking for memory errors by checking data and parity bits on occasions when data is being read from storage array 299 at the request of controlling device 220, and interface buffer 292 may incorporate logic to proactively initiate read accesses to memory cells within storage array 299 for analysis by bit analyzer 295 for indications of memory errors. In some embodiments, logic within interface buffer 292 to proactively initiate such checks for memory errors may be designed and/or programmed to carry out such operations in an opportunistic manner in which "dead time" between read and/or write accesses to storage array 299 is used to carry out checks for memory errors. This opportunistic approach may be deemed desirable to try to avoid delaying the carrying out of a read or write operation. In some variations logic within interface buffer 292 may rely on the occurrence of a minimum period of time of inactivity and/or other patterns of behavior occurring on memory bus 280a as an indicator of when a dead time is occurring or is about to occur. Such logic within interface buffer 292 may be designed and/or programmed to interpret times when memory controller 270 may have powered down memory bus 280a as an opportunity to carry out checks for memory errors.

In other embodiments, logic within memory controller 270 may be designed and/or programmed to provide interface buffer 292 with an indication of either upcoming dead time and/or an indication of the onset of dead time. This may be deemed desirable to allow better coordination of the transfer of addresses, commands and/or data initiated by memory controller 270 and memory error checking operations carried out by interface buffer 292. Also, in some variations, memory controller 270 may incorporate command reordering logic 279 having a buffer to store and reorder read/write commands received from controlling device 220 to create sequence of read/write commands ordered for greater efficiency given various possible characteristics of memory bus 280a and/or memory device 290. In such variations, memory controller 270 may be able to examine the read/write commands being reordered to provide an indication to interface buffer 292 of the length of time of either upcoming or currently occurring dead time.

Incorporating logic within interface buffer 292 to implement the generation and/or checking of parity bits for indications of memory errors in some embodiments may provide a way to reduce bus activity that might otherwise be required on memory bus 280a to communicate generated and/or retrieved parity bits across memory bus 280a as a result of parity bit generation and/or analysis being carried out within memory controller 270. Such bus activity might requiring a substantial proportion of the available time and/or bus cycles available to carry out other operations across memory bus 280a, especially if additional memory devices are coupled to memory controller 270 via memory bus 280b and memory device 290. In such embodiments where multiple memory devices are so connected, the provision of logic to generate and/or analyze parity bits corresponding to that incorporated within interface buffer 292 may provide added time saving by allowing parity bit generation and/or analysis to be carried out in parallel across multiple memory devices. However, in still other embodiments, it may be desirable to make use of time and/or bus cycles made available on memory bus 280a by the incorporation of parity generation and/or analysis logic into interface buffer 292 to transfer parity bits across memory bus 280a between memory controller 270 and memory device 290 that are generated and/or analyzed to detect the occurrence of transmission errors across memory bus 280a.

Figure 3:
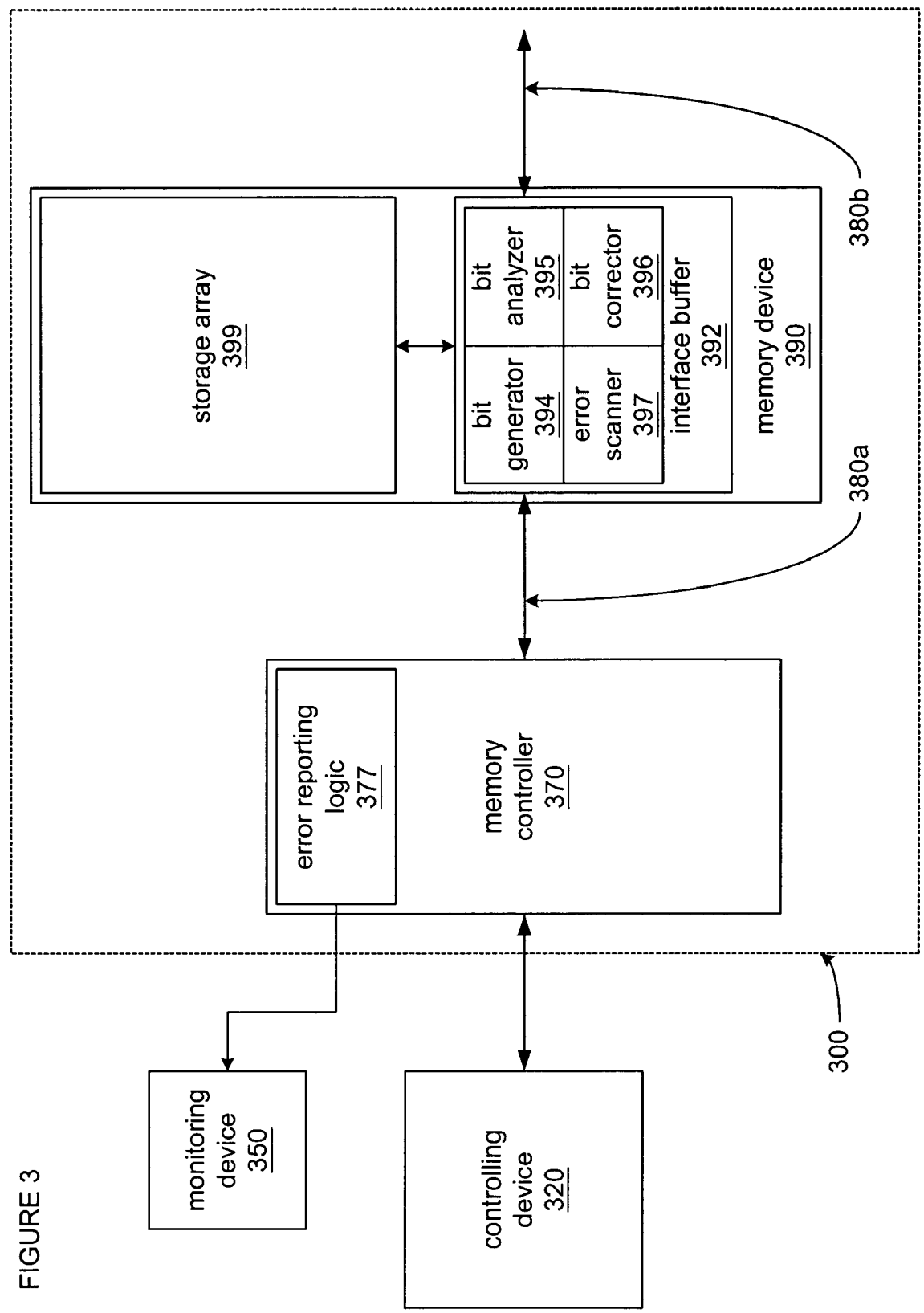
FIG. 3 is still another block diagram of an embodiment employing a memory system.

FIG. 3 is still another block diagram of an embodiment employing a memory system. In a manner not unlike memory system 200 of FIG. 2, memory system 300 is, at least in part, made up of memory controller 370 and memory device 390 coupled together via memory bus 380a in a point-to-point connection. Although FIG. 3 depicts the connection of only one memory device (namely memory device 390) to memory controller 370, this is but one example of a configuration of a memory system depicted for sake of simplicity of discussion, and as hinted in FIG. 3, interface buffer 392 of memory device 390 may provide the ability to form a point-to-point connection with another device via memory bus 380b.

Memory controller 370 controls the functions carried out by memory device 390 as part of providing another device, such as controlling device 320 coupled to memory controller 370, with access to memory device 390. Specifically, memory controller 370 coordinates accesses made to memory cells within memory device 390 to store and retrieve data in answer to read and write commands from controlling device 320. In some embodiments, memory controller 370 may incorporate error reporting logic 377 to relay indications of a memory error received from memory device 390 back to controlling device 320. In response, the controlling device may carry out various forms of diagnostic or other operations to discern the precise nature of the memory error and/or to isolate the memory error. The controlling device may log the occurrence of such an memory error and/or provide a message to a system administrator or other personnel of the occurrence of the memory error. Alternatively, error reporting logic 377 may relay an indication of a memory error received from memory device 390 to monitoring device 350 which may be a microcontroller or other device used to monitor the functionality of various devices, including memory device 390, and to take any of a number of possible actions in response to events such as memory data error.

Memory device 390 provides a number of memory cells within storage array 399 to store data that may be provided and/or required by controlling device 320. Interface buffer 392 within memory device 390 receives read and write commands across memory bus 380a, and accesses appropriate memory cells within storage array 399 to either store or retrieve data as commanded. To ensure against memory errors being introduced as data is stored or retrieved, or to at least ensure that occurrences of such errors are found, interface buffer 392 may incorporate circuitry to implement one of various possible forms of error checking and correction (ECC) algorithm for generating and analyzing ECC bits to detect and/or correct memory bit errors. Specifically, interface buffer 392 may incorporate bit generator 394 to generate ECC bits to be stored along with corresponding data within storage array 399, bit analyzer 395 to check data and corresponding ECC bits retrieved from storage array 299 for memory errors, and/or bit corrector 396 to rewrite portions of storage array 399 to correct at least single-bit ECC errors detected by bit analyzer 395. Depending on the ECC algorithm employed, some variations of such embodiments may also be capable of correcting 2-bit ECC errors occurring within sets of 4, 8 or 16 bytes of data. In such embodiments, where memory errors are found, interface buffer 392 may transmit an indication of such memory errors back to error reporting logic 377 within memory controller 370.

In still other embodiments, interface buffer 392 may incorporate scanning logic 397 to initiate the proactive reading and analysis of memory cells throughout storage array 399, using bit analyzer 395 to check data and corresponding ECC bits for indications of memory errors. In a manner not unlike what was discussed with regard to FIG. 2, such proactive checking and analysis of storage array 399 may be initiated by scanning logic 397 opportunistically, such as by sensing occurrences of dead time in which to carry out such checks and analysis between read/write operations, or with coordination between scanning logic 397 and memory controller 370 to avoid causing collisions with or delays in normal read and/or write operations carried out in response to read and/or write commands received by memory device 390 from memory controller 370. As previously discussed, inactivity lasting for a predetermined period of time and/or specific patterns of activity on memory bus 380a may be used by scanning logic 397 as an indicator of opportunities to carry out checking and analysis of memory cells within storage array 399, or memory controller 370 may analyze a series of read/write commands received from controlling device 320 to provide scanning logic 397 with information concerning the onset and/or duration of a dead time.

Incorporating logic within interface buffer 392 to implement some form of ECC algorithm may provide a way to reduce bus activity that might otherwise be required on memory bus 380a to communicate ECC bits across memory bus to support implementing an ECC algorithm within memory controller 370. Such bus activity might requiring a substantial proportion of the available time and/or bus cycles available to carry out other operations across memory bus 380a, especially if additional memory devices are coupled to memory controller 370 via memory bus 380b and memory device 390. In such embodiments where multiple memory devices are so connected, implementing an ECC algorithm within the interface buffers of each memory device may make possible carrying out the checking for and/or correcting of memory errors in parallel across multiple memory devices. However, in still other embodiments, it may be desirable to make use of time and/or bus cycles made available on memory bus 380a by the incorporation of parity and/or ECC support into both interface buffer 392 and memory controller 370 to detect and possibly correct the occurrence of transmission errors across memory bus 380a.

Figure 4:
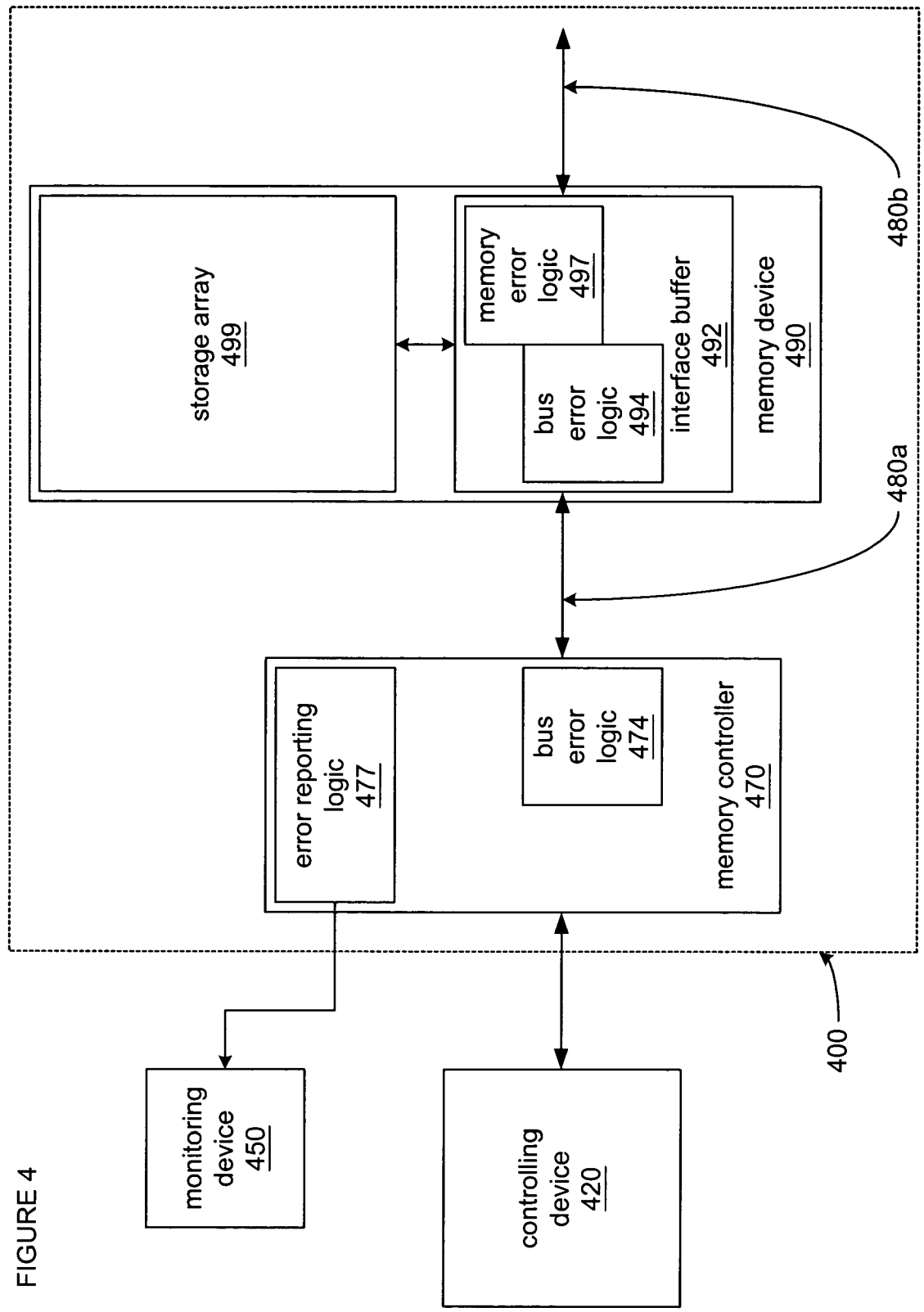
FIG. 4 is yet another block diagram of an embodiment employing a memory system.

FIG. 4 is still another block diagram of an embodiment employing a memory system. In a manner not unlike memory systems 200 and 300 of FIGS. 2 and 3, memory system 400 is, at least in part, made up of memory controller 470 and memory device 490 coupled together via memory bus 480a in a point-to-point connection. Although FIG. 4 depicts the connection of only one memory device (namely memory device 490) to memory controller 470, this is but one example of a configuration of a memory system depicted for sake of simplicity of discussion, and as hinted in FIG. 4, interface buffer 492 of memory device 490 may provide the ability to form a point-to-point connection with another device via memory bus 480b.

Memory controller 470 coordinates accesses made to memory cells within memory device 490 to store and retrieve data in answer to read and write commands from controlling device 420. In some embodiments, memory controller 470 may incorporate error reporting logic 477 to relay indications of a memory error received from memory device 490 back to controlling device 420. In response, the controlling device may carry out various forms of diagnostic or other operations to discern the precise nature of the memory error and/or to isolate the memory error, including logging the occurrence of a memory error and/or providing a message to a system administrator or other personnel. Alternatively, error reporting logic 477 may relay an indication of a memory error to monitoring device 450 which may be a device used to monitor the functionality of various devices, including memory device 490.

Memory device 490 provides a number of memory cells organized into an array within storage array 499 to store data that may be provided and/or required by controlling device 420. Interface buffer 492 within memory device 490 receives read and write commands across memory bus 480a, and accesses appropriate memory cells within storage array 499 to either store or retrieve data as commanded. To ensure against memory errors being introduced as data is stored or retrieved, or to at least ensure that occurrences of such errors are found, interface buffer 492 may incorporate memory error logic 497 implementing one of many possible forms of parity checking or error checking and correction (ECC) algorithm to detect and/or correct memory errors.

In a manner not unlike the various forms of memory error detection and/or correction logic discussed in FIGS. 2 and 3, memory error logic 497 may generate various parity and/or ECC bit values for storage within storage array 499, and/or may analyze various parity and/or ECC bit values retrieved from storage array 499 to detect indications of a memory error. Memory error logic 497 may also correct various forms of detected memory errors, specifically where some form ECC algorithm is employed. Furthermore, memory error logic 497 may be capable of independently accessing storage array 499 (i.e., carrying out read and/or write operations independently of those carried out as a result of commands received from memory controller 470) to proactively detect and/or correct memory errors. Such independent accesses to storage array 499 may be coordinated between memory error logic 497 and memory controller 470 to avoid delaying read/write accesses required by memory controller 470, or memory error logic 497 may carry out such independent accesses to storage array 499 on an opportunistic basis in a way intended to take advantage of dead time between accesses to storage array 499 made in response to commands received from memory controller 470. In various possible embodiments, some or all varieties of memory errors that are detected, but which may or may not be corrected, may be reported to error reporting logic 477.

Incorporating logic within interface buffer 492 to implement some form of parity and/or ECC algorithm may provide a way to reduce bus activity that might otherwise be required on memory bus 480a to communicate parity and/or ECC bits across memory bus 480a to support a parity and/or ECC algorithm within memory controller 470. As a result, more bus cycles and/or time may be made available on memory bus 480a to carry out other operations, or larger unbroken periods of time may be made available during which memory bus 480a may be powered down to conserve power.

Memory controller 470 and/or interface buffer 492 may incorporate bus error logic 474 and/or 494, respectively, to implement one or more of various possible algorithms to detect occurrences of bus errors resulting in incomplete or inaccurate transfers of addresses, commands and/or data across memory bus 480a, including the use of parity bits, ECC, cyclic redundancy checking (CRC), etc. For individual transfers and/or small numbers of transfers, parity and/or ECC bits may be generated by one of bus error logic 474 or 494 for transmission across memory bus 480a along with corresponding addresses, commands and/or data; and then received and analyzed by the other bus error logic 474 or 494 to detect the occurrence of bus errors. Whichever one of bus error logic 474 or 494 receives the parity and/or ECC bits may further attempt to correct the error, especially where an ECC algorithm is employed. Alternatively, where a transfer of addresses, commands and/or data entails the transferring of one or more packets or otherwise grouped pieces of information, a CRC algorithm may be employed by which one of bus error logic 474 or 494 generates a CRC value to be included within or to accompany a packet, and the other one of bus error logic 474 or 494 may analyze a packet and corresponding CRC value for an indication of a bus error. In some embodiments, where a bus error is detected, regardless of whether it is corrected, or not, the one of bus error logic 474 or 494 receiving the errant transfer may signal the other one of bus error logic 474 or 494 to repeat the errant transfer. In other embodiments, the one of bus error logic 474 or 494 receiving the errant transfer may signal error reporting logic 477 of the occurrence of the bus error.

Referring to FIGS. 2-4, regardless of whether parity or ECC algorithms are used to detect errors in interface buffers 292, 392 or 492, occurrences of memory errors may be reported to memory controllers 270, 370 or 470, respectively, in some possible embodiments. In other embodiments, where interface buffer 292, 392 or 492 incorporates circuitry to correct a memory error, as may be the case where an ECC algorithm is implemented, it may be deemed appropriate for no reporting of corrected errors to take place. In still other embodiments, circuitry incorporated within interface buffer 292, 392 or 492 may be designed and/or programmed to detect repeating patterns in memory errors that may indicate errors in data bit lines, stuck-at-zero, stuck-at-one, crosstalk and/or address decoding errors within storage array 299, 399 or 499, respectively. Such errors indicated by such patterns may be reported by interface buffer 292, 392 or 492 to memory controller 270, 370 or 470, respectively, regardless of whether such errors prove to be correctable, or not.

Regardless of the mechanism used to identify, select or coordinate times at which the checking for, and perhaps, correction of memory errors, interface buffer 292, 392 or 492 may be designed and/or programmed to delay the carrying out of read/write commands received from memory controller 270, 370 or 470, respectively, to accommodate a read and/or write operation already in progress as part of checking for and/or correcting memory errors. Such delaying may be carried out by providing memory controller 270, 370 or 470 with an indication that an error checking and/or error correction operation is underway. Alternatively, this indication may take the form of a "busy" indication provided by interface buffer 292, 392 or 492 in response to an attempted transmission of a read or write command by memory controller 270, 370 or 470, respectively. Such a busy indication may be in the form of a bus retry signal to memory controller 270, 370 or 470 that the transmission of the read or write command across memory bus 280*a*, 380*a* or 480*a* will have to be attempted again as a way of stalling acceptance of the read or write command to obtain additional time. Memory controller 270, 370 or 470 may respond to such an indication by transmitting a read/write command to memory device 290, 390 or 490 involving a storage array other than storage array 299, 399 or 499, respectively, in embodiments where memory device 290, 390 or 490 has more than one storage array. Alternatively, memory controller 270, 370 or 470 may respond to such an indication by transmitting a read/write command affecting a memory device other than memory device 290, 390 or 490 in embodiments of memory system 200, 300 or 400, respectively, that have more than one memory device.

Figure 5:
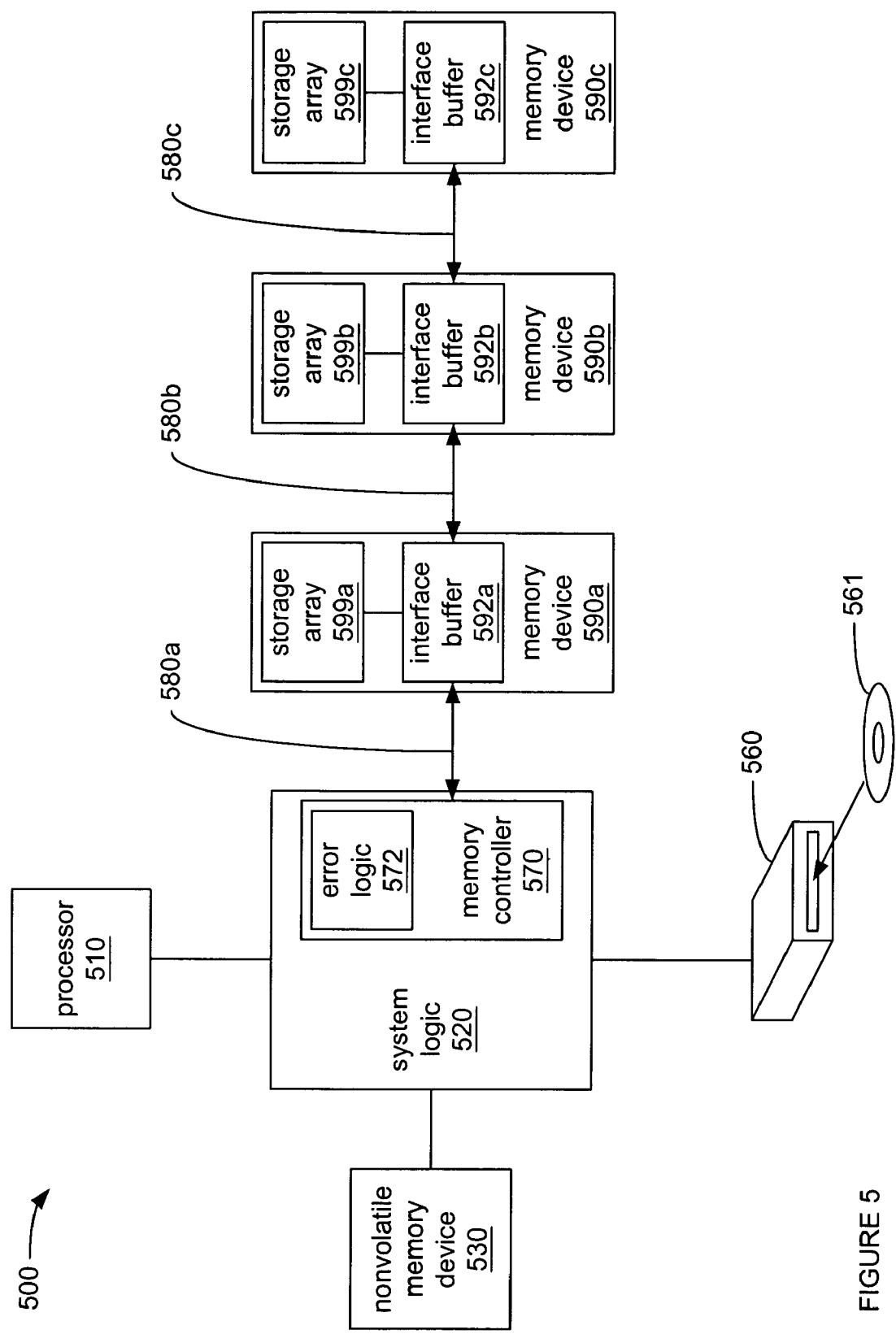
FIG. 5 is a block diagram of an embodiment employing a computer system.

FIG. 5 is a simplified block diagram of an embodiment employing a computer system. Computer system 500 is, at least in part, made up of processor 510, system logic 520, and memory devices 590*a-c*. System logic 520 is coupled to processor 510 and performs various functions in support of processor 510 including providing processor 510 with access to memory devices 590*a-c* to which system logic 520 is also coupled, using memory controller 570 within system logic 520. Processor 510, system logic 520 and memory devices 590*a-c* make up a form of core for computer system 500 that is capable of supporting the execution of machine readable instructions by processor 510 and storage of data and instructions within memory devices 590*a-c*.

In various embodiments, processor 510 could be any of a variety of types of processor including a processor capable of executing at least a portion of the widely known and used "x86" instruction set, and in other various embodiments, there could be more than one processor. In various embodiments, memory devices 590*a-c* and/or storage arrays 599*a-c* within memory devices 590*a-c* could be any of a variety of types of dynamic random access memory (RAM) including fast page mode (FPM), extended data out (EDO), single data rate (SDR) or double data rate (DDR) forms of synchronous dynamic RAM (SDRAM), RAM of various technologies employing a RAMBUS™ interface, etc., and memory controller 570 provides logic 520 with an appropriate interface for the type of memory being used. At least a portion of the memory cells of memory devices 590*a-c* are organized into rows and columns in a two dimensional storage array, though other organizations of memory cells are possible. As those skilled in the art will recognize, the depiction of three memory devices 590*a-c* is but an example of a memory system that could be a part of a computer system or other electronic system, and that a differing number of memory devices could be used without departing from the spirit and scope of the present invention as hereinafter claimed.

In some embodiments, system logic 520 is coupled to and provides processor 510 with access to storage device 560 by which data and/or instructions carried by storage media 561 may be accessed. Storage media 561 may be of any of a wide variety of types and technologies as those skilled in the art will understand, including CD or DVD ROM, magnetic or optical diskette, magneto-optical disk, tape, semiconductor memory, characters or perforations on paper or other material, etc. In some embodiments, nonvolatile memory device 530 is coupled to system logic 520 (or other part of computer system 500) and provides storage for an initial series of instructions executed at a time when computer system 500 is either "reset" or initialized (for example, when computer system 500 is "turned on" or "powered up") to perform tasks needed to prepare computer system 500 for normal use. In some variations of such embodiments, upon initialization or resetting of computer system 500, processor 510 accesses nonvolatile memory device 530 to retrieve instructions to be executed to prepare memory controller 570 for normal use in providing access for processor 510 to memory devices 590*a-c*. It may be that these same retrieved instructions are executed to prepare system logic 520 for normal use in providing access to storage device 560 and whatever form of storage media 561 that may be used by storage device 560.

In some embodiments, storage media 561 carries machine-accessible instructions that may be executed by processor 510 to cause processor 510 to carry out one or more tests of memory device 590*a-c* to determine what functions memory devices 590*a-c* may support. If it is determined that one or more of memory devices 590*a-c* are equipped with interface buffers (such as interface buffers 592*a-c*) that implement a form of parity and/or ECC capability to check and/or correct the contents of memory cells within one or more of storage arrays 599*a-c* for memory errors, as described above, then processor 510 may be caused to program or otherwise configure memory controller 570 and/or one or more of memory devices 590*a-c* to make use of such capabilities. In some variations, processor 510 may be caused to program memory controller 570 to coordinate occurrences of independent memory error checking by one or more of interface buffers 592a-c with the sending of read/write commands and/or the powering down of one or more of memory busses 580a-c by memory controller 570.

In variations of embodiments where memory controller 570 incorporates error logic 572 to report the occurrences of memory errors processor 510 may be caused to program error logic 572 to relay reports of memory errors to processor 510, thereby allowing processor 510 to execute machine-accessible instructions causing the processor to carry out diagnostics tests to more precisely diagnose the source of the memory error and/or mitigation efforts to attempt to isolate the memory error. In variations where error logic 572 and/or at least one of buffer interfaces 592a-c is capable of detecting and/or correcting bus errors occurring in transfers of addresses, commands and/or data across one or more of memory busses 580a-c, processor 510 may be further caused to program error logic 572 and/or at least one of buffer interfaces 592a-c to carry out such detection and/or correction of bus errors, and perhaps, to additionally signal processor 510 of the occurrence of bus errors to allow processor 510 to execute machine-readable code to carry out diagnostic or mitigation actions.

Figure 6:
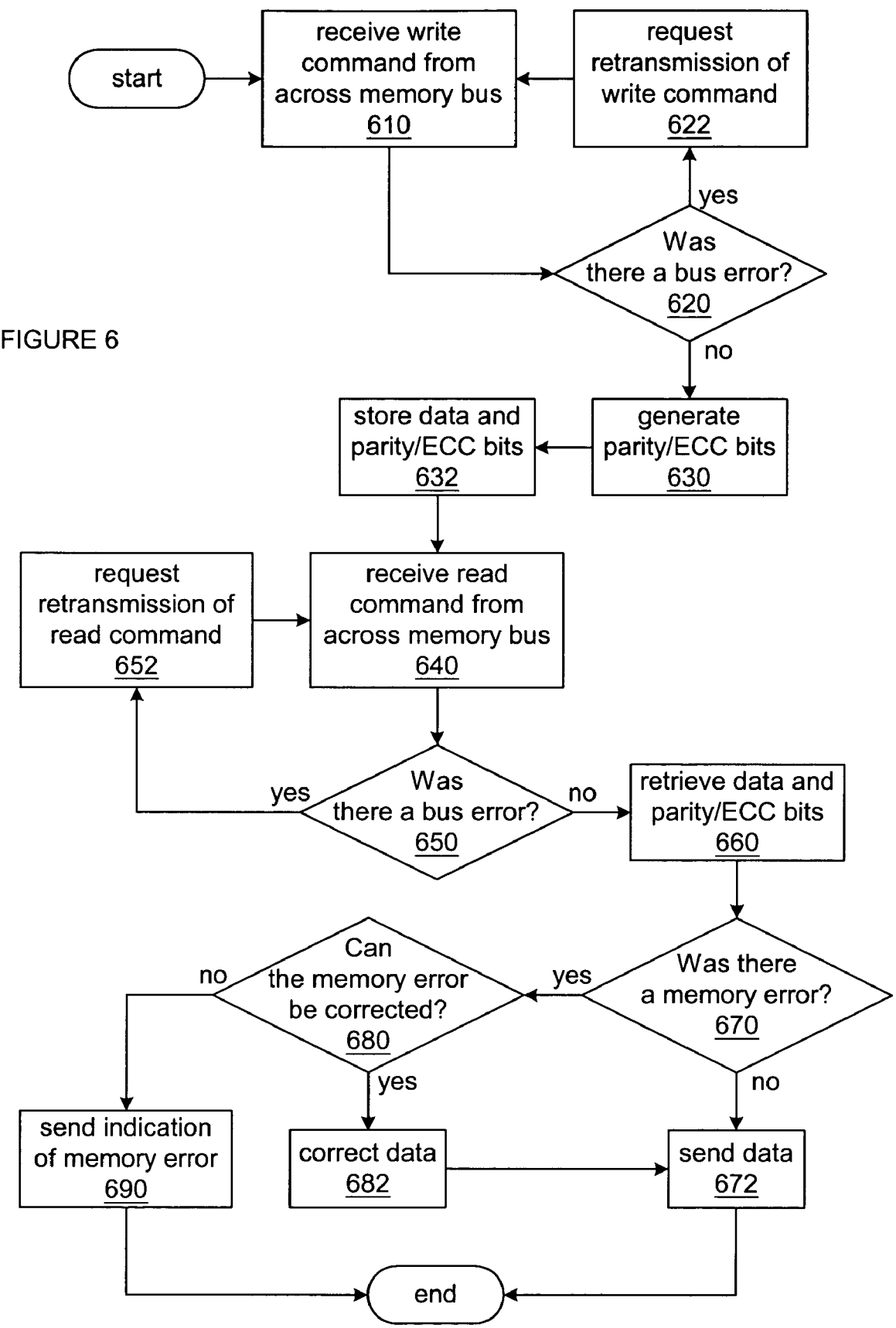
FIG. 6 is a flow chart of an embodiment.

FIG. 6 is a flow chart of possible embodiments. At 610, a write command is received from across a memory bus to store a piece of data, and at 620, a check is made as to whether or not a bus error occurred in the transmission of that write command across the memory bus. If there was a bus error, then a request is made to retransmit that write command at 622, followed by another receipt of that write command at 610. However, if there was no such bus error, then depending on whether a interface logic within a memory device implements a parity or ECC algorithm of some form, or both, parity and/or ECC bits are generated at 630, and both the data received with the write command and the parity/ECC bits are stored at 632.

At some later time, a read command is received from across the memory bus to retrieve the piece of data at 640, and at 650, a check is made as to whether or not a bus error occurred in the transmission of that read command across the memory bus. If there was a bus error, then a request is made to retransmit that read command at 652, followed by another receipt of that read command at 640. However, if there was no such bus error, then data along with corresponding parity/ECC bits are retrieved from storage within the memory device at 660, and a check is made at 670 for indications that a memory error occurred involving the retrieved data. If no memory error is detected, then the retrieved data is sent across the memory bus at 672. However, if a memory error involving the retrieved data is detected, then if at 680, it is possible to correct the data, such correction takes place at 682 and the data is sent across the memory bus at 672. Alternatively, if it is not possible to correct the data, then an indication of the occurrence of the memory error is sent at 690.

Figure 7:
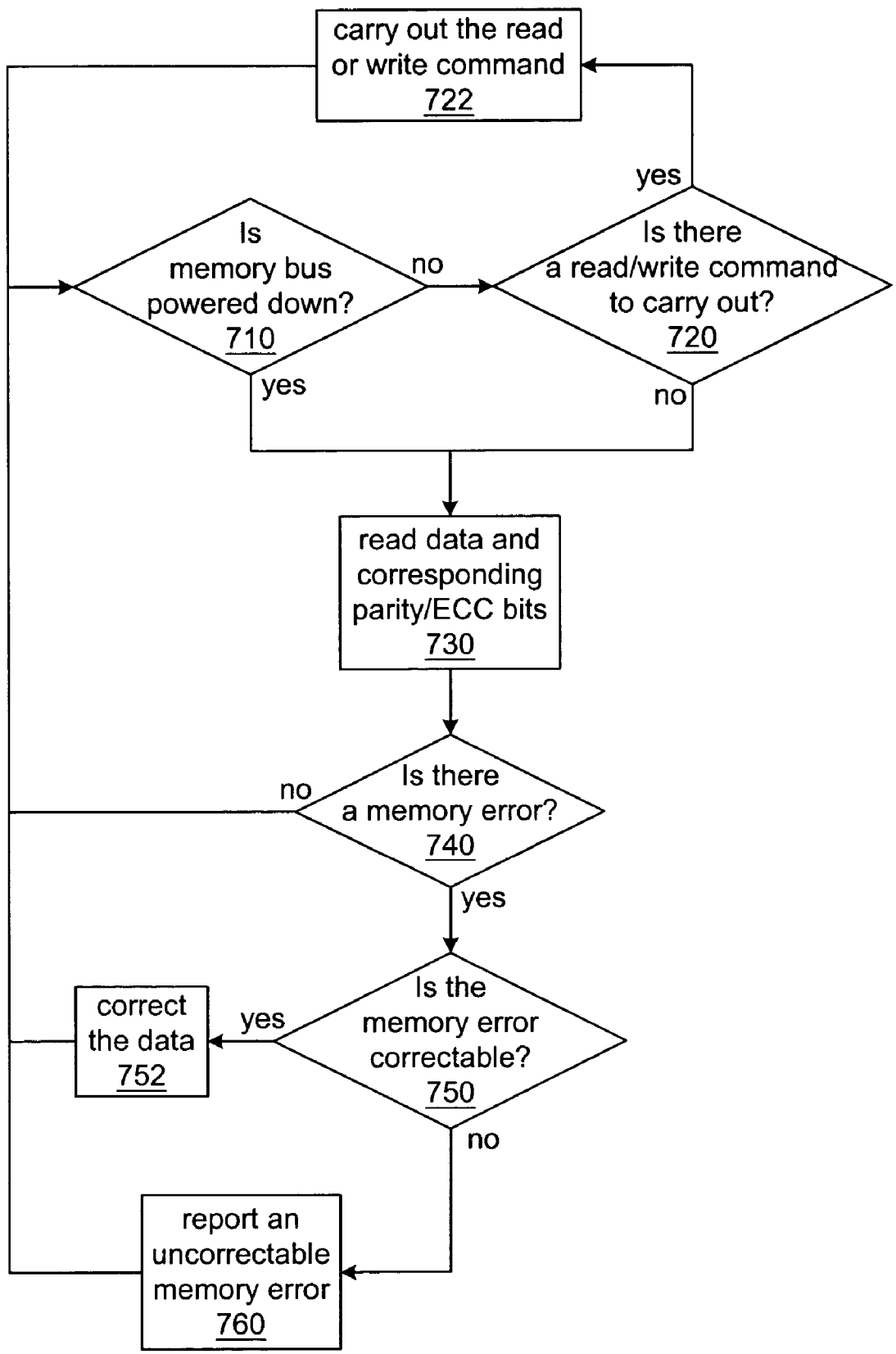
FIG. 7 is another flow chart of an embodiment.

FIG. 7 is another flow chart of possible embodiments. At 710, a check is made by circuitry within a memory device of whether or not a memory bus coupling the memory device to another device from which read, write and/or refresh commands are received has been powered down. If such a memory bus has been powered down, then the powering down of a memory bus may be taken as an indication of the occurrence of dead time providing an opportunity to carry out one or checks for memory errors, and at 730, a portion of the memory device is read to obtain data and corresponding parity and/or ECC bits, depending on whether logic within the memory device implements a form of parity or ECC algorithm. If such a memory bus has not been powered down, then a check is made at 720 as to whether or not there is a read or write command to carry out. If there is no read or write command pending, then the lack of a read or write operation to be carried out may also be taken as an indication of the occurrence of dead time, and at 730 a portion of the memory device is read to obtain data and corresponding parity and/or ECC bits. If there is a read or write command to be carried out, then that read or write command is carried out at 722 before the status of the memory bus is again checked at 710.

Following the reading of data and corresponding parity/ECC bits at 730, the data and corresponding parity/ECC bits are analyzed at 740 to determine whether or not there is an indication of a memory error. If no indication of a memory error is found, then the status of the memory bus is again checked at 710. However, if a memory error is found, then at 750 a determination is made as to whether or not the memory error is correctable. In some embodiments in which a parity algorithm is implemented, it may be that no memory error is actually correctable. In other embodiments in which some form of ECC algorithm is implemented, the error may or may not be correctable depending on the specific ECC algorithm and the number of data bits that are found to be errant. If the memory error is correctable, then correction takes place at 752, before the status of the memory bus is again checked at 710, and otherwise, the occurrence of an uncorrectable memory error is reported at 760.

The invention has been described in some detail with regard to various possible embodiments. It is evident that numerous alternatives, modifications, variations and uses will be apparent to those skilled in the art in light of the foregoing description. It will be understood by those skilled in the art that the present invention may be practiced in support of many possible types of memory devices employing any of a number of possible memory technologies. It will also be understood by those skilled in the art that the present invention may be practiced in support of electronic devices other than computer systems such as audio/video entertainment devices, controller devices in vehicles, appliances controlled by electronic circuitry, etc.

What is claimed is:

1. A memory device comprising:
a storage array comprised of a plurality of memory cells;
an interface buffer coupled to the storage array, and having a first interface to couple the memory device to a first memory bus to couple the memory device to a memory controller;
memory error logic associated with the interface buffer to carry out a check for memory errors within the storage array under at least one of conditions comprising in response to a command from the memory controller and during an idle period associated with transactions carried out by the memory controller on the first memory bus that involve the storage array; and
bus error logic associated with the interface buffer to carry out a check for bus errors in transactions across the first memory bus between the memory controller and the first interface.

2. The memory device of claim 1, wherein the memory error logic is a component of the interface buffer, and wherein the memory device is comprised of a circuitboard to which is attached at least one integrated circuit that comprises the storage array and at least one integrated circuit that comprises the interface buffer.

3. The memory system device of claim 1, wherein, the first memory bus provides a point-to-point connection between the memory device and the memory controller, the interface buffer has a second interface to couple the memory device to a second memory bus to provide a point-to-point connection between the memory device and another memory device, and the interface buffer passes through bus activity between the first and second memory busses that does not involve the storage array.

4. The memory device of claim 3, wherein both a transfer of data between the memory controller and the first interface of the interface buffer and a transfer of data between the second interface of the interface buffer and the another memory device occur with data transmitted in a packets.

5. The memory device of claim 3, wherein the memory error logic corrects a memory error, if a memory error is detected and is correctable; and the memory error logic transmits a signal to the memory controller if a memory error is detected and is not correctable.

6. The memory device of claim 1, wherein a transaction across the first memory bus entails the transmission of data in a packet with CRC information, and the bus error logic examines the data and the CRC information to check for an occurrence of a bus error.

7. A computer system comprising:
a processor;
a disk storage device coupled to the processor
a memory controller coupled to the processor;
a first memory bus coupled to the memory controller;
a first memory device having a first storage array comprised of a plurality of memory cells and a first interface buffer coupled within the first memory device to the first storage array, wherein the first interface buffer provides a first interface by which the first memory device is coupled to the first memory bus forming a point-to-point connection between the memory controller and the first interface, a first memory error logic to carry out a check for memory errors within the first storage array under at least one of conditions comprising in response to a first command from the memory controller and during an idle period associated with transactions carried out by the memory controller on the first memory bus that involve the first storage array, and a first bus error logic associated with the first interface buffer to carry out a check for bus errors in transactions on the first memory bus between the memory controller and the first interface.

8. The memory device of claim 1, wherein during the idle period, there are no transactions carried out by the memory controller on the first memory bus that involve the storage array.

9. The computer system of claim 7, wherein during the idle period, there are no transactions carried out by the memory controller on the first memory bus that involve the first storage array.

10. The computer system of claim 7, wherein the first interface buffer further comprises a second interface.

11. The computer system of claim 10, further comprising:
a second memory bus coupled to the second interface; and
a second memory device having a second storage array comprised of a plurality of memory cells and a second interface buffer coupled within the second memory device to the second storage array, wherein the second interface buffer provides a third interface by which the second memory device is coupled to the second memory bus forming a point-to-point connection between the third interface and the second interface, a second memory error logic to carry out a check for memory errors within the second storage array under at least one of conditions comprising in response to a second command from the memory controller and during an idle period associated with transactions carried out by the memory controller on the second memory bus that involve the second storage array, and a second bus error logic associated with the second interface buffer to carry out a check for bus errors in transactions across the second memory bus between the memory controller and the second interface.

12. The computer system of claim 11, wherein during the idle period, there are no transactions carried out by the memory controller on the second memory bus that involve the second storage array.

* * * * *